May 20, 1930.  I. A. MERLE  1,759,238

WHEEL

Filed Oct. 27, 1928

INVENTOR.
Isidore A. Merle
BY M. C. Frank
ATTORNEY.

Patented May 20, 1930

1,759,238

UNITED STATES PATENT OFFICE

ISIDORE A. MERLE, OF ALAMEDA, CALIFORNIA, ASSIGNOR TO EAMES COMPANY, OF SAN FRANCISCO, CALIFORNIA, A CORPORATION OF CALIFORNIA

WHEEL

Application filed October 27, 1928. Serial No. 315,414.

The invention particularly relates to vehicle wheels provided with resilient tires.

An object of the invention is to provide a wheel of the class described in which cooperating disc members are utilized for providing the central wheel structure, said members cooperating to produce a wheel of maximum strength and rigidity for the weight of material therein.

Another object of the invention is to provide a wheel of the class described in which the disc members thereof are arranged to be formed of like castings.

A further object of the invention is to provide a wheel of the class described in which the disc members are particularly designed to be cast of aluminum.

Yet another object of the invention is to provide a wheel of the character described in which the mounting of a continuous resilient tire thereon is arranged to be effected without necessitating a circumferential stretching of the tire.

A still further object of the invention is to provide a wheel of the class described having means cooperative with the tire for positively preventing any radial or circumferential displacement thereof from its mounting on the wheel.

The invention possesses other objects and features of advantage, some of which, with the foregoing, will be set forth in the following description of a preferred form of the invention, and in the accompanying drawings, in which Figure 1 is a side view of a wheel, parts broken away, embodying the invention and having a solid resilient tire.

As is well recognized, wheels of the disc type have many advantages over spoked wheels, particularly when used for supporting vehicles. Heretofore it has been a usual custom to make the one or more discs of a disc wheel out of pressed steel, with the plate from which the disc is formed having a minimum gauge for producing a wheel of required strength. This type of wheel is particularly designed for strength radially thereof, but is found under some circumstances of use, to permit an undesirable amount of more or less resilient relative axial movement of the hub and rim portions, whereby the wheel is not truly rigid in an axial direction and parallelism of the rim and hub axes is not maintained while the wheel is in use. Then too, a disc of the aforesaid type of wheel cannot advantageously be made as a casting of iron, steel, or other cast material, owing to the probability of failure, directly or by fatigue, due to the permitted degree of distortion thereof. Furthermore, discs of present design, if cast, would be of steel, whereby they would be too heavy for practical use on many types of vehicles. In accordance with the present invention, however, a wheel is provided which is built up of cast disc members so designed that they may be formed of aluminum or other relatively light material to provide a particularly light wheel of maximum rigidity for its size whereby the advantages of disc wheels are retained without their disadvantages. The present wheel, it is noted is formed with complementary sections so related that they provide for mounting and securing a resilient tire on the wheel as the same is assembled, thus eliminating the provision of a separate tire securing means for the wheel.

Figure 1:
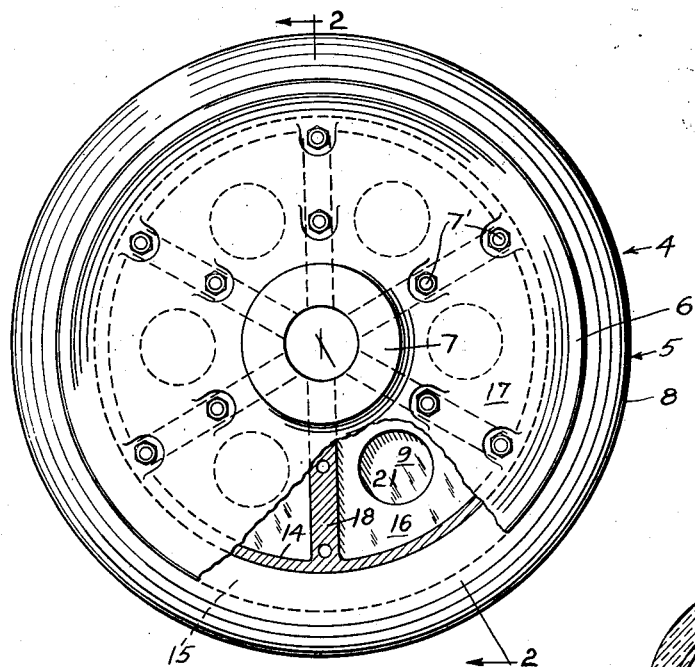
Figure 2:
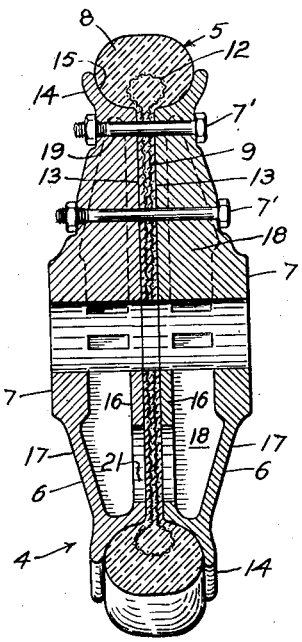
Figure 2 is a sectional view of the wheel shown in Figure 1 taken on the broken line 2—2 in said figure.

Referring now to the disclosure of Figures 1 and 2, it is seen that the present invention is incorporated in a wheel 4 essentially comprising a tire 5 mounted on a wheel body formed of a pair of axially aligned disc members 6 fixed together by means of bolts 7'. The discs 6 are disposed in complementary back-to-back relation and are provided with hub portions 7 cooperative to define a hub for the mounting of the wheel on a shaft. As the precise manner of mounting the wheel is immaterial to the present invention, no mounting of the wheel is disclosed.

As shown, the tire 5 is of the solid rubber type and comprises a tread portion 8 and a web portion 9. In section the tire tread 8 may be of any required outline. As particularly disclosed, the tread has a substantially elliptical section. The web 9 extends radially inwardly in the central plane of the rim, said web being of uniform thickness whereby its side faces are parallel. It will now be noted that the web 9 is arranged to be utilized for holding the tire to the discs and said web is accordingly fixedly associated with the tread. As disclosed, the web extends integrally from the tread structure as an extension thereof and is reinforced by means of fabric 12 imbedded therein and extending well into the tread. The web 9 is preferably formed as a continuous annulus and terminates at the bore defined by the hub portion 7. The back, or inner, faces 13 of the disc members are plane and are arranged to engage the web 9 in clamped relation between them.

As shown, the peripheral edge portions 14 of the disc members are formed to provide complementary concave rim sections 15 cooperative to receive the inner tread side for holding the tread in position more or less independently of the web 9. In this manner, the tire is arranged to be positively held to the disc structure at all times, it being noted that the present means is particularly designed for use in mounting solid rubber tires on wheels, since such tires, if designed to be held in place merely by reason of their mounting in peripheral wheel grooves, may so expand when heated as to so loosely fit said grooves that they may become displaced therefrom if not otherwise held.

The disc members 6, it will now be noted, are formed with opposed and spaced inner and outer walls 16 and 17 respectively, said walls connecting the disc edge portions 14 with the hub portions 7, whereby each member 6 constitutes a double-disc structure. Axially directed webs 18 extend between the walls 16 and 17, said webs preferably extending radially from the hub bore to a connection with and across the edge portion 14. In this manner, the disc members are positively stiffened against any axial deformation thereof, since the webs 18 cooperate with the abutting wall portions to provide, in effect, I-beam spokes. The perforations 19 for the bolts 7' are preferably provided axially through the webs 18, as shown, whereby no relative springing of the walls 16 and 17 results when the bolts are tightened for clamping the tire in its mounted relation to the members 6.

Preferably, and as shown, the members 6 are formed as integral cast structures, the walls 16 being provided with openings 21 between the webs 18 both for permitting a casting of members and for lightening the same. Owing to the internal bracing provided in the present structure, the latter is arranged to be formed as a casting of some material lighter than iron or steel, aluminum or an aluminum alloy being a preferred metal for the purpose. Furthermore, the members 6 are exactly alike, whereby the same mold model is arranged to be used for forming a pair of the members. As shown, the inner wall 16 is flat, while the outer wall 17 is conically tapered to provide a wheel of greater thickness axially thereof at the hub, than at the rim, such being a preferred structure and giving added strength.

Figure 3:
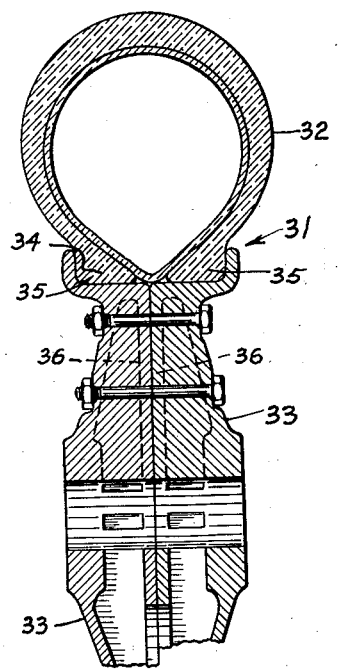
Figure 3 is a fragmentary view similar to that of Figure 2 showing a wheel embodying the invention and provided with a pneumatic tire.

Referring now particularly to the embodiment of Figure 3, it is noted that in this embodiment, a wheel 31 is provided having a pneumatic tire 32 engaged and held mounted by means of a pair of like disc members 33. The latter members are generally like those of the members 6 of the previously described embodiment except that the outer edges thereof are formed to cooperatively define a peripheral groove 34 for cooperatively receiving the beads 35 of the tire, said tire being particularly disclosed as being of the so-called "straight-side" type. The tire disclosed lacks a radial web for disposal between the members 33, and the opposed inner walls 36 of said members are accordingly directly engaged when the wheel is assembled.

It is noted that in both of the disclosed embodiments, a tire is engaged between a pair of the hollow disc members, and that a separation of these members permits a removal and replacement of the tire without involving a stretching thereof or a special type of rim structure for the purpose. The latter feature is particularly valuable for the solid type of rubber tire which need not ordinarily be frequently changed.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In a wheel, a pair of complementary disc members releasably fixed together in coaxial relation to define a central hub and a peripheral tire receiving groove, said members each having axially spaced walls connected at the hub and groove-defining portions of the members.

2. In a wheel, a pair of complementary disc members cooperative to define a central hub and a peripheral tire receiving groove, each of said members having axially spaced walls connected by axially and radially directed webs.

3. In a wheel, a pair of like disc members disposed in coaxial and complementary relation to define a central hub and a peripheral tire receiving groove, each of said members comprising axially spaced inner and outer walls integrally connected by radially directed webs, said inner walls having the outer surfaces thereof plane and extending perpendicularly to the wheel axis.

In testimony whereof I affix my signature.

ISIDORE A. MERLE.